United States Patent [19]

Touchet et al.

[11] Patent Number: 4,843,114

[45] Date of Patent: Jun. 27, 1989

[54] RUBBER COMPOUND FOR TRACKED VEHICLE TRACK PADS

[75] Inventors: Paul Touchet, Woodbridge; Gumersindo Rodriguez, Fredericksburg; Paul E. Gatza, Daniel P. Butler, both of Alexandria; Dawn Crawford, Stafford; Alan R. Teets, Springfield; Hank O. Feuer, Woodbridge; David P. Flanagan, Alexandria, all of Va.

[73] Assignee: The United States of America as represented by the Secretary of the Army, Washington, D.C.

[21] Appl. No.: 150,107

[22] Filed: Jan. 29, 1988

[51] Int. Cl.$^4$ .............................. C08K 3/04; C08F 8/00
[52] U.S. Cl. .................................. 524/87; 524/255; 524/343; 524/496; 524/521; 525/192; 525/194; 525/196; 525/222
[58] Field of Search .................... 525/338, 192-194 525/339, 222, 196; 524/521, 255, 87, 343, 496

[56] References Cited

U.S. PATENT DOCUMENTS

| | | | |
|---|---|---|---|
| 4,384,081 | 5/1983 | Kubo et al. | 525/339 |
| 4,464,515 | 8/1984 | Rempel et al. | 525/339 |
| 4,486,480 | 12/1984 | Okumoto et al. | 524/527 |
| 4,503,196 | 3/1985 | Rempel et al. | 525/338 |
| 4,581,417 | 4/1986 | Buding et al. | 525/339 |
| 4,631,315 | 12/1986 | Buding et al. | 525/339 |
| 4,656,219 | 4/1987 | Oyama et al. | 525/339 |
| 4,666,971 | 5/1987 | Greenhalgh | 524/521 |
| 4,713,409 | 12/1987 | Hayes et al. | 524/521 |
| 4,720,526 | 1/1988 | Roland | 524/521 |

*Primary Examiner*—Herbert J. Lilling
*Attorney, Agent, or Firm*—Anthony L. Lane; Werten F. W. Bellamy; John E. Becker

[57] ABSTRACT

A highly improved elastomeric composition, process, and articles made thereof, wherein the novel composition is characterized by greatly increased wear longevity, thermomechanical stability, highly improved tear and tensile strength at high temperature useage, in addition to high resistance to burning in open flame, as well as high resistance to cutting, chipping, cracking and crack propagation particularly in product use for tank track pads and other related track system elastomeric component products; wherein the improved composition is a unique combination of its respective polymer, filler, curing and antidegradant systems, in which the polymer system either consists of about 100 parts by weight of highly saturated nitrile polymer or of various novel blends of the highly saturated nitrile usually in majority amounts together with minority amounts of carboxylated nitrile, with or without additional minority or near equal parts of nitrile rubber; and wherein the curing system may include various blends of from between about 1.5 to about 30 parts by weight of a metallic oxide, along with from between about 25 to about 50 parts by weight of a metallic methyl-methacrylate resin, together with from about 0.25 to about 3 parts by weight of a curative compound; which composition is further well suited for manufacture of various abutment and motion stop or limit members subjectable to repetitive engagement by moving mechanisms, and for various at least semi-flexible baffle or skirt-like members useable with various air cushion type vehicles or the like.

25 Claims, 2 Drawing Sheets

RUBBER COMPOUND FOR TRACKED VEHICLE TRACK PADS

GOVERNMENT INTEREST STATEMENT

The invention described herein may be manufactured, used, and licensed by or for the Government for Governmental purposes without the payment to us of any royalties. This patent application is being fully assigned to the U.S. Government.

BACKGROUND OF THE INVENTION

This invention generally relates to an improved rubber compound, and more specifically relates to the improvement of the elastomeric components for tread pads of tracked vehicles, especially endless track military vehicles. Track laying vehicles wherein a continuous track is constantly layed down in the direction of movement of the associated vehicle are well known. Examples of such track laying devices are the military tanks and personnel carriers. Such devices have an endless track with a plurality of linked metal track shoes. These military tracked vehicles and other commercial type tracked vehicles are frequently equipped with rubber track pads, rubber blocks or endless-band rubber track to reduce shock, noise, wear and damage to road surfaces. These endless tracks render the vehicles operational in rough, uneven terrain when necessary under military maneuvers. The vehicles, however, also travel over roads and hard surfaces and therefore the elastomeric components of the endless tracks should be of the type that wears well under abrasive rough terrain conditions. One example of a suitable track laying structure is disclosed in U.S. Pat. No. 3,078,128 issued Feb. 19, 1963 to the United States of America. Examples of previous tank tread pads and related compositions are well defined in various other prior U.S. patents such as U.S. Pat. No. 3,781,067; U.S. Pat. No. 4,279,448; U.S. Pat. No. 4,587,280; U.S. Pat. No. 4,461,516; and U.S. Pat. No. 4,470,641.

Historically, field performance of these elastomeric track pad components has been poor, especially for the medium to heavy tonnage tracked vehicles, 40–60 Tons. The service life of these tank pads is affected not only by the terrain and environmental conditions but also by the speed, cornering, braking, weight of the vehicle, and the track tread design. While the operation life of the metal components is approximately 5000 miles for vehicles of the 55 Ton weight class, the average life of the rubber pads is seldom more than 1500 miles under the best circumstances, and is usually less than 500 miles under the severest conditions. The elastomeric components of an endless track are affected in several ways depending upon service. Directly, it can cause cuts, tears, chunking, blow-outs and abrasive wear. Indirectly, it causes damage through hysteretic heating, environment convection and surface/terrain heating. Those skilled in the art are aware of the types of failures on rubber tank track pads, roadwheels and rubber blocks requiring frequent and costly replacement of the elastomeric components.

Track pads for shoes presently are made from styrene-butadiene rubber (SRB). The widespread use of SBR in track pad applications appears to be based on cost, historical precedent and the fact that at times the United States Government has required that the materials used in their devices be available from sources within the United States to insure a continued supply. These factors in many ways are detrimental to the policy of continuing to use natural rubber for track pads and some shoe components, particularly since natural rubber is not available within the United States. Therefore, it is of the utmost important to develop and use improved synthetic rubbers to improve the performance of tank track pads and shoes.

To improve field or service performance of tank pads, one must first identify those properties that are most needed and then optimize these. This is by no means is trivial task. Those skilled in the art would agree that to improve performance of pads and shoes, properties such as cutting and chipping resistance, tear and tensile strength, crack growth resistance, abrasion resistance, hysteresis and thermomechanical stability all have to be improved.

OBJECTS AND BRIEF SUMMARY OF THE INVENTION

The primary object of the present invention is to overcome the aforementioned problems associated with prior track pads by providing an improved elastomeric composition which is particularly adaptable for fabricating track pads having improved resistance to cuts, tears, chunking, blowouts and abrasive wear.

A further object of the present invention is to provide such a novel elastomeric composition of matter having many uses including for other related products such as road wheels, bushing members, gun abutment stops useful for association with tank track systems and other military armament/equipment.

Other objects and advantages of this invention will become more apparent from the following detailed description, with the novel features, arrangements and combinations being clearly pointed out in the specification as well as in the appended claims.

In accordance with the present invention, it has been found unexpectedly that the above objects and advantages are accomplished by our novel track pad composition by our novel selective use of polymers, fillers, the curing system and the proper processing thereof from which to make pads, shoes, bushings, solid rubber roadwheel surfaces and other items having greatly improved service life, as summarized in the following.

It is to be understood that for the purpose of this invention, the term "vulcanize" is used in its broadest sense to include all means of cross-linking rubbery polymers both with and without the use of elemental sulfur.

The improved composition tank pads should include at least one surface portion, preferably the portion which contacts the ground, made of an elastomeric material comprised of the unique combination of a polymer system, a filler system, a curing system, and an antidegradant system. The polymer system may comprise a pure or a blend polymer system such as:

(A) 100 parts of highly saturated nitrile; or alternatively
(B) a blend of from about 80 parts to about 90 parts of highly saturated nitrile, and about 10 parts to about 20 parts of carboxylated nitrile; or
(C) a blend of from about 45 parts to about 90 parts of highly saturated nitrile, and from about 1 to about a maximum of 5 parts of carboxylated nitrile, and from about 5 to about 50 parts of nitrile rubber.

The filler system may comprise from about 15 to about 25 parts of a highly reinforcing small particle carbon black such as any of these designated as N-110, N-121, N-220, or N-330 by ASTM D-1765; or it may alternatively comprise a medium processed channel black.

The curing system preferably includes from about 1.5 to about 30 parts of a metallic oxide such as zinc oxide or magnesium oxide; and from about 25 to about 50 parts of a metallic methyl-methacrylate such as zinc methyl-acrylate resin; and from about 0.25 to about 3 parts of a curative compound such as dicumyl peroxide or others as will described in more detail hereinafter. The curing system relates to or embodies the ingredients which will be activated to achieve the cross-linking of the polymer chain in the compound.

The antidegradant system is preferably comprised of at least one antioxidant which among others may comprise from about 0.25 to about 2 parts of a polymerized 1,2-dihydro-2,2,4-trimethyl-quinoline(TMQ). It is to be understood that for each of the foregoing four systems, that the stated parts are to be by weight per 100 parts of the selected polymer system.

The rubbery or elastomeric composition of the present invention can be prepared and compounded using any of the conventional compounding and mixing techniques using conventional rubber processing equipment such as a Banbury mixing or mixing mill. The unvulcanized rubbery composition is then pre-formed through a rubber extruder and larger amounts or thicknesses are pre-heated before assembling it with any applicable metal insert subassembly component or plate member together with a suitable heat-activatable adhesive which are then placed into a mold for the particular configuration articles such as a tank track pad, bushing, shoe and/or solid tire or other product. A vulcanization temperature of at least 320 degrees Fahrenheit should be used to fully activate the peroxide curing system when making our highly improved tank track pads. Premature partial vulcanization must be avoided from the normal or inherent heat generated during the use of the mixing equipment. Therefore, mixing apparatus of a type provided with cooling means is preferably utilized.

The track pads after vulcanization are of improved construction with the rubbery composition exhibiting a relatively hign abrasion resistance, high cutting and chipping resistance, high tear and tensile strength at high temperatures, decreased hysteresis, high resistance to fire and to cracking or crack propagation, and shows good product uniformity and good thermomechanical stability, with supporting test results being described in the following detailed description.

DETAILED DESCRIPTION OF THE PREFERRED EMBODIMENT

Figure 1:
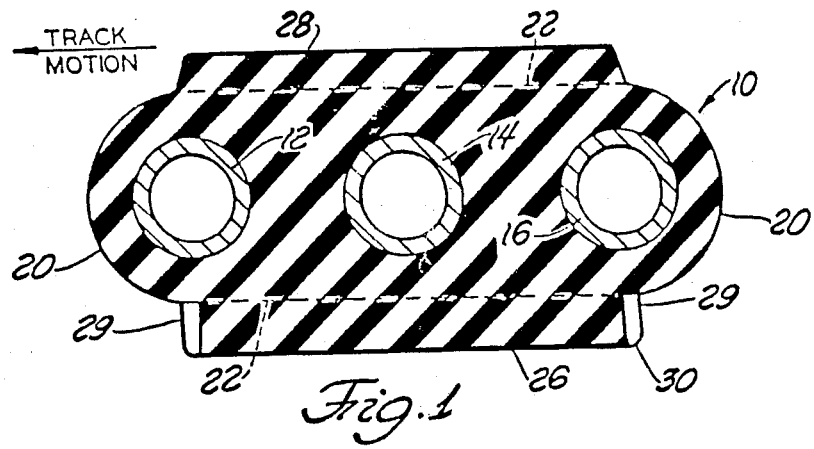
FIGS. 1, 2 and 3 are a transverse cross-sectional views through various types of exemplary track shoes or pads made of our new composition.

Referring in greater detail to FIG. 1, there is shown one illustrative form of a track shoe 10 of generally conventional overall design. This particular shoe includes three circular metal tubes 12, 14, and 16 extending between two metal end plates, not readily visible in the drawings. Each end plate has an upper flat edge 22, a lower flat edge 22 and two circular end edges 20. In practice, each track section comprises two track shoes 10 arranged in side-by-side relation, as shown for example in U.S. Pat. No. 4,165,906 to J. O. Fix. Non-illustrated connector pins and elastomeric bushings extend through tubes 12 and 16 into connector links to interconnect the track sections to adjacent track sections. The various track shoes 10 making up a complete endless track are structurally identical. These FIGS. 1 and 2 and much of their description are copied from U.S. Pat. No. 4,461,516.

Figure 2:
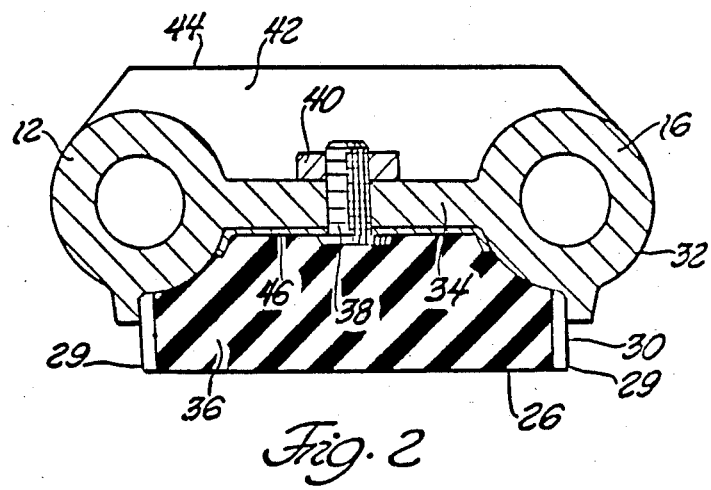
Figure 3:
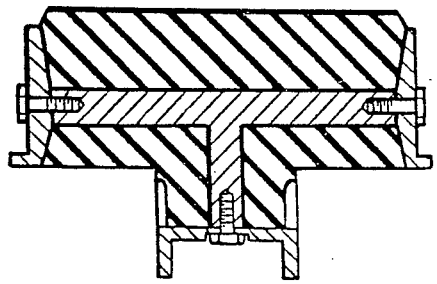
Figure 4:
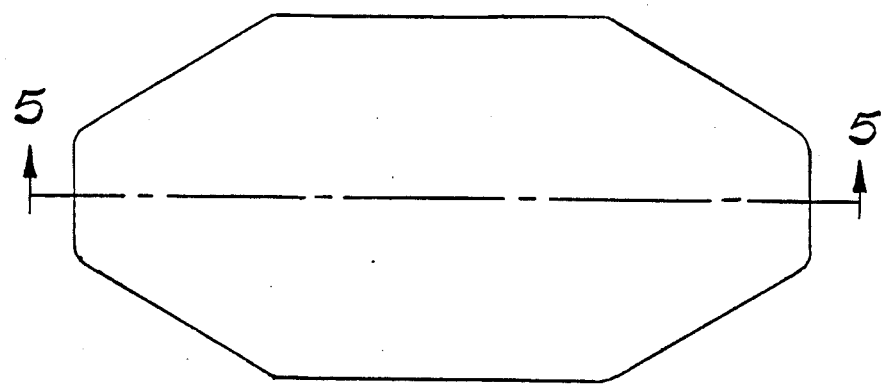
FIGS. 4 and 5 are top plan and cross sectional views respectively for an M-60 form of track shoe utilizing our new composition and process.
Figure 5:
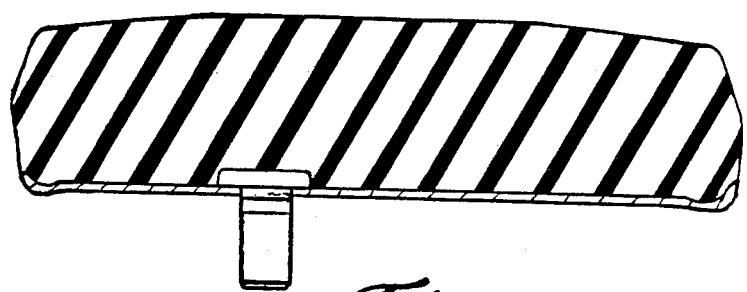
Figure 6:
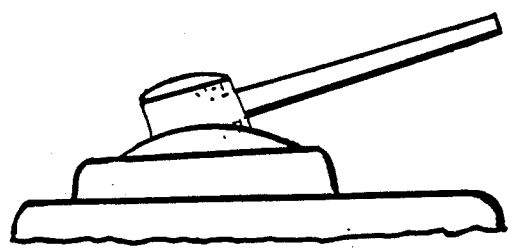
FIG. 6 is a diagrammatic fragmentary elevational view showing a large bore gun which utilizes a shock absorbing abutment which is comprised of our improved composition.
Figure 7:
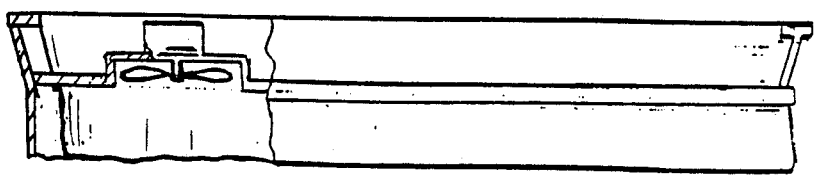
FIG. 7 is a diagrammatic side view of an air cushion type of vehicle which can utilize flexible shirts made of our new composition.

In the illustrated track shoe the space between the two end plates is occupied by a resilient elastomeric pad 24 having a terrain-engagement surface 26. Upper surface 28 of the elastomeric pad is engaged by a non-illustrated road wheel carried on a swingable suspension road arm in conventional fashion. Our improved composition is particularly useful for making very substantively improved track pads of various forms and shapes. FIG. 2 illustrates a second type of track shoe with a pad 36 of our improved composition. The shoe comprises a metal casing 32 that includes a web 34 and two tubes 12 and 16 adapted to receive non-illustrated connector pins. The elastomeric pad 36 is removably received in a cavity on the lower face of web wall 34 between the tube outer surfaces. Retention of the improved pad 36 in the cavity is accomplished by a screw or stud 38 extending from a backing plate 46 into a nut 40. The upper surface of web wall 34 has a elastomeric member 42 molded thereon to provide a flat runway surface 44 for non-illustrated road wheel.

The improved composition tank pads should include at least one surface portion, preferably the portion which contacts the ground, made of our improved elastomeric material comprised of a unique combination of a polymer system, a filler system, a curing system, and an antidegradant system. The polymer system may comprise a pure or a blend polymer system such as:
(A) 100 parts of highly saturated nitrile polymer, or alternatively
(B) a blend of from about 80 parts to about 90 parts of highly saturated nitrile, and from about 10 parts to about 20 parts of carboxylated nitrile; or still further alternatively
(C) a blend of from about 45 parts to about 90 parts of highly saturated nitrile, and from about 1 to about a maximum of 5 parts of carboxylated nitrile, and from about 5 to about 50 parts of nitrile rubber.

The filler system may comprise from about 15 to about 25 parts of a highly reinforcing small particle carbon black such as any of those designated as N-110, N-121, N-220, or N-330 by ASTM D-1765; or alternatively and preferably may comprise medium processed channel black. The carbon black filler system may also be blended to include parts of silica materials such as from about 1 to about 15 parts of fumed silica which silica contributes to the overall 15-25 parts by weight of the highly reinforcing filler material. The total filler system should not exceed the aforestated maximum of about 25 parts by weight of 100 parts.

The curing system herein relates to or embodies the ingredients which will be activated to achieve the cross-linking of the polymer chain in the compound. The curing system preferably includes from about 1.5 to about 30 parts of a metallic oxide such as zinc oxide or magnesium oxide; and further from about 25 to about 50 parts by weight of a metallic methyl-methacrylate resin which may be selected from a group including a least zinc methyl-methacrylate resin and zinc dimethyl-methacrylate resin; and still further includes a curative compound of from about 0.25 parts to about 3 parts by weight selected from a group including (i) dicumyl peroxide, (ii) derivatives of dicumyl peroxide, (iii) sulfur, and (iv) various sulfur donor chemicals.

It is to be noted that any use of sulfur donor chemicals will depend upon the degree of saturation or unsaturation of the highly saturated nitrile. For example, when the formulation of claim 1 hereinafter includes highly saturated nitrile having degrees of unsaturation of approximately 5%, or of approximately only 2.5%, respectively, a curative compound may include one of various sulfur donor compounds. Two preferred examples thereof include (i) N-cyclo-hexyl-2-benzothiazole sulfenamide, and
(ii) tetra-methyl-thiuram disulfide.

The antidegradant system is comprised of from about 0.25 to about 2.0 parts by weight of at least one antioxidant selected from the group including at least the antioxidants from the respective families of (a) quinolines, (b) substituted para-phenylenediamines (PPD), and (c) hindered bisphenols. One preferred antioxidant will consist of from about 0.25 to about 2.0 parts by weight of polymerized 1,2, dihydro-2,2,4-trimethyl-quinoline (TMQ). Another may comprise a substituted para-phenylenediamine (PPD) which is N-Isopropylphenyl-p-phenylene-diamine.

A nitrile rubber may be defined as a straight chain copolymer of a diene and an unsaturated nitrile, the more common being the copolymer of butadiene and acrylonitrile. The majority of nitrile rubbers which are available today are made by copolymerizing these two monomers. Nitrile rubber is available in several standard grades of oil resistance based on the acrylonitrile content of the polymer ranging from about 18 to 50%, with 34% being a common typical figure for a general purpose grade. Generally, the grades are referred as to very high, high, medium high, medium, medium low, and low acrylonitrile content. The following is a chemical representation of each of the two monomers separately, and of the resulting copolymer, nitrile rubber (NBR).

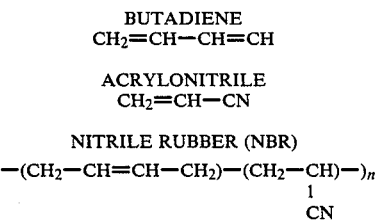

The very high and high acrylonitrile polymers are used where the utmost in oil resistance, aromatic fuels, and solvent resistance is required. The medium grades are used in applications where greater swelling of the rubber is tolerable. The low and medium low acrylonitriles are used where low temperature flexibility is of greater importance.

However the polymer used in this subject application rubber formulation of invention is a highly hydrogenated nitrile copolymer with slight double bonds. Highly saturated nitrile rubbers, HSN, are presently produced by the selective and controlled hydrogenation of nitrile rubber, NBR. Examples of such copolymers are disclosed in U.S. Pat. Nos. 4,337,327; 4,384,081; 4,464,515; 4,503,196; and German Pat. Nos. 2,539,132 and 2,913,992. At least three companies are known to produce highly saturated nitrile copolymers useful in the practice of this invention and having with various degrees of hydrogenation. Mobay Corporation in Pittsburg, Pa. 15205-9741, produces at least two grades of HSN's under the commercial name of "THERBAN". Polysar Ltd. in Akron, Ohio, 44313, produces at least three grades of HSN's under the trade name of "TORNAC". Nippon Zeon Co., Ltd. in New York City, N.Y. 10017, produces at least three grades of HSN's under the trade name of "ZETPOL". Grades are determined by the degree of unsaturation of the HSN, typically 5%, 2.5%, and 1%, respectively.

A carboxylated nitrile copolymer, XNBR is the resulting polymer from the modification of a nitrile copolymer, NBR to include carboxylic groups in the copolymer chain. This type of polymer contains in addition to acrylonitrile and butadiene, one or more acrylic-type acids as part of the comonomer system. The polymerization of these monomers produces a chain similar to a normal nitrile rubber except for the carboxyl groups which are distributed along the chain with a frequency of about 1 to every 100 to 200 carbon atoms.

This type of polymer is unique in that it can be vulcanized by reactions of the carboxylic group as well as conventional sulfur-type vulcanization. This polymer has been used in a blend with HSN's in the rubber formulation subject of this invention because the carboxy modification exhibits much higher tensile strength and modulus, lower elongation, higher hardness, much improved hot tear and tensile strength, better low-temperature brittleness, improved ozone resistance, and better retention of properties after air aging at high temperatures, all important properties for tank pad performance.

Carboxylated nitriles, XNBR, suitable for the practice of the invention are produced by most nitrile rubber, NBR, manufacturers. B. F. Goodrich Co. produces XNBR's under the commercial trade name of "HYCAR" while the Goodyear Co. produces XNBR's under the name of CHEMIGUM". Both companies; have business locations in Akron, Ohio.

Up to 50% of total nitrile component of the inventive composition can be of a standard grade of nitrile copolymer, i.e., not highly saturated nitrile, without significant degradation of performance as a track pad material. This can significantly reduce the cost of the pad. Recommended quantities are from 5 parts to 50 parts standard nitrile rubber per 100 parts total nitrile copolymer in the inventive composition. One preferred and fully tested composition contain 100 parts of HSN as the polymer system.

The following example is a representative comparison of our newly developed composition versus commercially procured pads which were field tested on a military M-60 tank and on a much heavier experimental military vehicle known as a Counter Obstacle Vehicle (COV). The tests for the COV were conducted at the Ft. Belvoir, Va. Engineering Proving Grounds, more particularly to measure for thermal buildup, abrasion resistance, adhesion resistance, chunking and chipping, and all terrain mobility. The M-60 tank tests were conducted at the Yuma, Arizona Proving Grounds and more particularly directed to operation on paved roads, hilly cross-country terrain, and various overall terrain combination tests.

EXAMPLE

A rubbery composition was prepared and compounded according to the present invention by mixing in a basically conventional manner 100.0 parts of highly saturated nitrile polymer (HSN), 2.0 parts zinc oxide, 0.5 parts 1,2-dihydro-2,2,4-trimethylquinoline (TMQ), 20.0 parts carbon black, 30.0 parts zinc methyl-methacrylate resin, and 1.3 parts dicumyl peroxide. the unvulcanized rubbery composition was then preformed through a rubber extruder, preheated to 180° F., placed in the desired mold, and vulcanized at about 330° F. for 80 minutes. The HSN Polymer was obtained commercially from Goldsmith Eggleton, Akron, Ohio with the trade name "ZETPOL 2020". The TMQ antioxidant was obtained commercially from R. T. Vanderbilt in Norwalk, Ct. with the name "AGERITE RESIN D". The carbon black was obtained commercially from Summit Chemical Co. under a trade name known as "MPC BLACK". The zinc methylmethacrylate resin was obtained commercially from Yardley Ball Corp. in Yardley, Pa. with the trade name "Z-MAX MA". The dicumyl peroxide curative was obtained commercially from the Hercules Co. in Akron, Ohio, with the trade name "DI CUP R". In order to form the sample test track pads, the extruded preheated rubber was assembled with applicable metal inserts and a heat-activated adhesive into a mold where vulcanization was carried out in a heated press. The physical properties of the resulting new pads were measured and are presented and are compared in Table 1 below to those of standard commercial pads as tested. The track pads designated STD. T-107 and STD T-142 tested were standard stock pads for the Army's experimental Counter Obstacle Vehicle (COV), and the M-60 tank respectively, made from styrene-butadiene rubber (SBR) and are of the type presently employed on military tracked vehicles. The specific formulation of the standard pads is proprietary to the manufacturer and not known by the inventors, but it can be characterized as a common type of styrene-butadiene vulcanizate.

TABLE 1

| PROPERTIES OF ELASTOMERIC PAD COMPOUNDS | | | |
|---|---|---|---|
| PROPERTIES | OUR NEW COMPOUND | COV STANDARD T-107 | M-60 STANDARD T-142 |
| ORIGINAL | | | |
| TENSILE STRENGTH. PSI | 3960 | 3010 | 2820 |
| 200% MODULUS. PSI | 843 | 780 | 580 |
| ELONGATION. % | 570 | 520 | 510 |
| SHORE A HARDNESS. PTS | 78 | 64 | 69 |
| BASHORE REBOUND. % | 30 | 26 | 36 |
| SPECIFIC GRAVITY | 1.1373 | 1.1685 | 1.1559 |
| 40% COMPRESSIBILITY. PSI | 966 | 495 | 510 |
| TEAR STRENGTH. DIE C | | | |
| UNAGED. Lbs/In | 449 | 266 | 310 |
| AT 250° F. Lbs/In | 234 | 152 | 115 |
| ABRASION | | | |
| TABER. GR/1000 CYCLES | .0015 | .0308 | .0364 |
| PICO RATING | 691 | 790 | 101 |
| GOODRICH CUTTING AND CHIPPING | | | |
| DIAMETER LOSS. INCHES | .0540 | 2320 | 0820 |
| WEIGHT LOSS. GRAMS | .7500 | 3.1540 | 1.1450 |
| DYNAMIC PROPERTIES GOODRICH FLEX | | | |
| TEMPERATURE RISE | | | |
| INTERNAL. °C. | 84 | 72 | 50 |
| EXTERNAL. °C. | 58 | 30 | 30 |
| BLOW OUT TIME. MIN. | 5 | 24 | 37 |
| DEMATTIA FLEX | | | |
| CRACK GROWTH | | | |
| UNAGED. MILS/MIN. | 6 | 26 | 24 |
| 20 HRS AT 250° F. MILS/MIN. | 12 | 264 | 435 |
| CRACK INITIALIZATION, CYCLES × $10^3$ | 110 | 8.7000 | 18 |
| AFTER OVEN AGING 70 HRS AT 250° F. | | | |
| ELONGATION RETENTION. % | 81 | 12 | 38 |
| TENSILE RETENTION. % | 100 | 45 | 57 |

The above tests were carried out according to accepted Industry Standards as listed in Tables 2 below:

TABLE 2

| PROPERTY TESTS | |
|---|---|
| 1. MOONEY VISCOSTITY AND CURVE | ASTM D 1646 |
| 2. RHEOMETER DATA AND CURVE | ASTM D 2084 |
| 3. PROPERTIES OF CURED RUBBER RUN AT ROOM TEMPERATURE | |
|    A. SPECIFIC GRAVITY | ASTM D 792;PARA 15 |
|    B. TENSILE STRENGTH | ASTM D 412 |
|    C. ELONGATION | ASTM D 412 |

TABLE 2-continued
PROPERTY TESTS

| | | |
|---|---|---|
| D. | 100,200, AND 300% MODULUS | ASTM D 412 |
| E. | HARDNESS, IRHD AND SHORE A | ASTM D 1415 |
| F. | RESILIENCE, BASHORE REBOUND | ASTM D 2632 |
| G. | TEAR STRENGTH, DIE B AND DIE C | ASTM D 624,DIES B AND C |
| H. | TROUSER TEAR WITH FABRIC INSERT | |
| I. | ABRASION, TABER | ASTM D 3389 |
| J. | ABRASION, PICO | ASTM D 2228 |
| K. | COMPRESSIBILITY | |
| L. | DISPERSION RATING AS OBSERVED UNDER A 60 POWER MICROSCOPE AND DARKFIELD REFLECTED LIGHT MICROSCOPE | |
| M. | PUNCTURE RESISTANCE | |
| N. | CUTTING AND CHIPPING | |
| 4. | PROPERTIES ON CURED MATERIALS RUN AT 250° F. 300° F. | |
| A. | TEAR STRENGTH, DIE B AND DIE C | ASTM D 624,DIES B AND C |
| B. | TROUSER TEAR WITH FABRIC INSERT | |
| C. | COMPRESSIBILITY | |
| D. | PUNCTURE RESISTANCE | |
| E. | TENSILE, ELONGATION, AND MODULUS A 160° F. 212° F. AND 250° F. | ASTM D 412 |
| 5. | FLEX FATIGUE TESTS: | |
| A. | DEMATTIA AND ROSS CUT GROWTH UNAGED, AFTER AGING 70 HOURS at 212° F. AND AFTER AGING 20 HOURS AT 250° F. (RUN AT 250° F.) | ASTM D813 ASTM D430, METHOD B |
| B. | DEMATTIA CRACK INITIATION | ASTM D 623, METHOD A |
| C. | GOODRICH FLEX AT 122° F. | USING A .175 IN. STROKE AND 141.6 PSI FOR DETERMINING HEAT BUILD-UP AND USING A 0.30 IN.STROKE WITH 141.6 OR 265. PSI PRESSURE FOR BLOW-OUT TEST |
| D. | ROSS FLEX CRACK GROWTH UNAGED, AFTER AGING AT 212° F. AND RUN AT 250° F. | ASTM D 1052 |
| 6. | OZONE RESISTANCE | ASTM D 1149 AND D518 METHOD B |
| 7. | BRITTLENESS AT - 40° F. | ASTM D 21137 |
| 8. | PEEL ADHESION INITIALLY AND AT 250° F. | ASTM D 429,METHOD B AND MIL-T-1189 1D,PARA 4.6.7.3. |
| 9. | DSC & DTA OF UNAGED & AGED SAMPLES | |

Some of the more important properties for track pad applications are:
1. Cutting and chipping resistance.
2. Tear strength, (ambient and high temperature).
3. Crack growth resistance, (ambient and high temperature).
4. Fatigue life under compressive stresses.
5. Low heat build-up and high abrasion resistance.

The statistics set forth hereinabove in Table 1 show the superiority in the properties of our improved elastomeric compound over that used in the standard production pads. Data depicted in Table 1 is the result of tests conducted in the laboratory from molded T-107 and T-142 tank pads, COV and M-60 respectively. The geometry of both type of pads is different. Therefore, curing characteristics and polymer flow patterns during vulcanization may produce small differnces in the physical properties between the two types of pads.

Analysis of the data depicted in Tables 1 and 2 show that the tensile strength of our improved elastomeric compound is 32% higher as used the T-107 pads and 40% higher for the T-142 pads. The retention of tensile strength after heat aging was 100% for the T-107's and T-142's. The standard production pads retained only 45% of the tensile strength for the T-107's and 57% for the T-142 pads. The rebound and elongation was about the same for our improved pad as for the standard compound. The hardness of the improved material is 22% higher for our improved composition in the T-107 pads and 13% higher for the T-142 pads. The increase in hardness produced a 95% improvement in he load bearing capabilities of our improved composition pads. Another significant improvement was achieved on tear resistance with a 69% improvement for our improved composition in the T-107s and 45% for T-142's at ambient temperature. Tear strength at high temperature produced improvement of 54% for our improved T-107 pads and double the tear resistance for our improved T-142 pads.

Abrasion resistance is a very important property and was measured by two methods, Taber abrasion and Pico index, respectively. Both test methods indicated an improvement of 24 times better on Taber and 9 times better on Pico for our improved composition T-142 pads while for our improved T-107 pads the Taber was 20 times better but the Pico indicated a 12.5% decreases. The observed mode of failure for tank pads during cross-country operations is chunking and chipping. This property was measured with the B. F. Goodrich Cutting and Chipping machine and both diameter and weight loss of the specimens were recorded. Test results for diameter and weight loss were in excellent agreement producing the same degree of improvement for both types of our improved composition test pads. Our improved composition pads exhibited a 76% improvement for T-107 pads and 34% better for the T-142's.

The improved elastomeric tank pads exhibited a higher internal temperature when tested for heat build-up as well as during field testing. However, the unique combination of the highly saturated nitrile rubber and zinc-methylmethacrylate with the peroxide cure, produces an unparalleled heat resistance that prevents premature failure.

Crack growth resistance relates to the ability of a rubber compound to deter crack propagation once the rubber has been cut as happens during cross-country operations. Crack propagation deteriorates into tear and eventually chunking and chipping. Crack growth was measured using a Ross tester. Specimens were tested at ambient temperature and after being heat aged at 250° F. In addition the resistance to crack initiation was measured. Resistance to crack growth was 400% better at ambient temperatures for both our improved composition T-107 and T-142 elastomeric pads. At high temperature the crack growth resistance of our T-107's was improved 22 times while for the T-142's it was improved 36 times over the standard production compounds.

Two performance test programs were carried out using appropriately formed tank pads to compare the performance of pads of the standard styrene-butadiene composition to the inventive nitrile rubber composition on actual tracked vehicles. Two types of vehicles were employed to carry out the field tests, a Counter-Obstacle-Vehicle (COV) which is an engineering type tracked vehicle, weighing about 72 tons, and an M-60 battle tank weighing about 45 tons. The testing of the COV pads, (T-107's) was performed over a severe course designed to combine all possible operational and terrain factors deemed relevant for the application. The test plan for the M-60 field test was designed to include three phases consisting of a 2000 mile paved surface course, 900 mile hilly cross-country course and a 1000 mile combination course. All these tests were successfully completed by tank pads made from our improved composition which is the subject of this invention.

Complete results of the COV T-107 track pad field test and results from field test on the T-142 tank pads from the M-60 tank confirm that a distinct technological breakthrough in tracked vehicle pad performance has been achieved. The COV was initially tested for a total of 1600 miles including portions in hard track and all type terrain. The wear of the pads with our new rubber formulation was significantly less than the conventional rubber used for tank pads. Additional tests have confirmed the greatly improved performance beyond 3000 miles with still no indication of failure, although some abrasive wear is evident. Projected results indicate that the pads with the new formulation will have a service life in excess of about 3500 miles while the standard production pads exhibit an average service life of 1200 miles under similar testing conditions.

During the paves course portion of the M-60 field test, standard production pads failed on the average at 1200 miles. The pads with our disclosed improved rubber formulation were tested for 2000 miles, the maximum duration allocated in the test plan for the paved course. At the end of the test the limited wear of the new formulation pads indicated a projected service life of 3,400 miles, a service level never before achieved by any conventional rubber pad. Subsequent actual field tests have proven continued good useful life at over 3000 miles on the same paved course.

The above results show the superior service life of our improved elastomeric compound over that used in the standard pads. The service life of our improved composition pads on paved road is three times better than the standard pads. In the more sever cross-country operations the improved pads exhibit a service life of 2.5 longer than the standard pads.

It should be pointed out that there is the significant difference in weight between the M-60 and the COV; the M-60 weighs approximately 45 Tons as opposed to the 72 tons for COV. This weight difference by itself can account for the difference in pad performance between the two vehicles but the fact remains that for either vehicle our improved formulation exhibits up to more than double the service life of a standard production tank pad.

It is to be understood that because the highly saturated nitrile exhibited distinguishing characteristics of inherent ozone, heat and weather resistance which precluded deterioration both in the field and in storage, there was no need to include a separate antiozonant for precluding ozone attack. To add such an ingredient would be a wasteful, useless exercise. Additionally, the improved rubber formulation exhibited self extinguishing characteristics when subjected to an open flame. It also exhibits resistance to chemical warfare agent decontaminants. Exhibiting a tensile strength retention over 90% after immersion in a DS-2 fluid for 24 hours. DS-2 in a U.S. Army general purpose decontaminant fluid for chemical warfare agents.

From the foregoing detailed description, it is apparent that a greatly improved elastomeric composition has been developed which achieves all the objects and has the advantages set forth hereinabove. While some specific test examples have been described more particularly for tank track pad applications, it is to be understood that other variations in the composition, and other potential uses such as abutments or stops for large bore guns, and flexible elastomeric skirts for air cushion type vehicles, are contemplated to be within the spirit of the invention. Accordingly, reference should be made to the appended claims for the governing scope hereof inasmuch as those skilled in the art may make various changes and modifications and other uses without departing from the spirit and scope of this invention.

What is claimed is:

1. An improved vulcanizable elastomeric composition that has a unique combination of respective polymer, filler, curing, and antidegradant systems, comprising:
   A. said polymer system is selected from the group consisting of
      (a) about 100 parts by weight of highly saturated nitrile polymer having a degree of unsaturation ranging between about 1% to about 20%;
      (b) a blend of from about 80 to about 90 parts by weight of highly saturated nitrile polymer having a degree of unsaturation ranging between about 1% to about 20%, and of from about 10 to about 20 parts by weight of carboxylated nitrile; and
      (c) a blend of from about 45 to about 90 parts of highly saturated nitrile polymer having a degree of unsaturation ranging between about 1% to about 20%, and of from about 1 to a maximum of about 5 parts of carboxylated nitrile polymer, and of from about 5 to about 50 parts of nitrile rubber; and
   B. said curing system comprising
      (a) from about 1.5 to about 30 parts by weight of a metallic oxide selected from the group consisting of zinc oxide and magnesium oxide;

(b) from about 25 to about 50 parts by weight of a metallic methylmethacrylate resin selected from the group consisting of at least a zinc methylmethacrylate resin and a zinc dimethyl-methacrylate resin;
(c) a curative compound of from about 0.25 parts to about 3 parts selected from the group consisting of:
  (i) dicumyl peroxide,
  (ii) derivatives of dicumyl peroxide;
  (iii) sulfur, and
  (iv) sulfur donor chemicals.

2. The composition of claim 1, wherein said filler system comprises from about 15 to about 25 parts by weight of a highly reinforcing filler material.

3. The composition of claim 2, wherein said filler system is selectable from a group including the group consisting of:
(a) medium processed channel black; and
(b) highly reinforcing small particle carbon black selected from the group consisting of (1), (2), (3), and (4), as designated in the Table herein below:

and of from about 5 to about 50 parts of nitrile rubber;
B. said filler system comprising from about 15 to about 25 parts by weight of a highly reinforcing filler material;
C. said curing system comprising
  (a) from about 1.5 to about 30 parts by weight of a metallic oxide selected from a group consisting of zinc oxide and magnesium oxide;
  (b) from about 25 to about 50 parts by weight of a metallic methylmethacrylate resin selected from a group consisting of at least a zinc methylmethacrylate resin and a zinc dimethyl-methacrylate resin;
  (c) a curative compound of from about 0.25 parts to about 3 parts selected from the group consisting of:
    (i) dicumyl peroxide,
    (ii) derivatives of dicumyl peroxide;
    (iii) sulfur, and
    (iv) sulfur donor chemicals; and
D. said antidegradant system comprises from about

TABLE

| | Carbon Blacks | | | | | | | | |
|---|---|---|---|---|---|---|---|---|---|
| | Target Values | | DBP No. | | | | Pour | Vulcanizates Containing Carbon Black | |
| Designation | Iodine Adsorption No., [4]D 1510, g/kg | DBP No. D 2414, cm³/100 g | Compressed Sample, D 3493, cm³/100 g | CTAB, D 3765, m²/g | Nitrogen Adsorption, D 3037, m²/g | Tint Strength, D 3265 | Density, D 1513, kg/m³ (lb/ft³) | ΔStress[B] at 300% Elongation MPa (psi) caused at 145° C. (293° F.) D412, D3182, and D3192 | |
| | | | | | | | | 15 min | 30 min |
| 1. | 145 | 113 | 98 | 126 | 143 | 124 | 335(21.0) | −0.5(−70) | 0(0) |
| 2. | 121 | 132 | 112 | 121 | 132 | 121 | 320(20.0) | +2.0(+290) | +3.3(+480) |
| 3. | 121 | 114 | 100 | 111 | 119 | 115 | 345(21.5) | +0.3(+50) | +0.9(+130) |
| 4. | 82 | 102 | 88 | 83 | 83 | 103 | 375(23.5) | +1.4(+200) | +1.7(+250) |

Note 1-The iodine absorption number and DBP number values represent target values. A target value is defined as an agreed upon value on which producers center their production process and users center their specifications. All other properties shown are averages of typical values supplied by several manufactures.
Note 2-IRB data was obtained from tests performed during the certification of IRB No. 6 carbon Black.
[4]In general, Method D1510 can be used to estimate the surface area of furnace blacks but not channel, oxidized, and thermal blacks.
[B]ΔStress - stress at 300% elongation of test black - stress at 300% elongation of IRB No. 6.
[C]Stress 300% elongation MPa (psi)cured at 145° C.(293° F.) for 50 min. (Difference from IRB No. 6.)
S212: - 3.4(−490)
S315: - 3.4(−490)

4. The composition of claim 1, wherein said antidegradant system comprises from about 0.25 to about 2.0 parts by weight of an antioxidant selected from the group consisting of:
(a) quinolines,
(b) substituted para-phenylenediamine (PPD), and
(c) hindered bisphenols.

5. An improved vulcanizable elastomeric composition that has a unique combination of respective polymer, filler, curing, and antidegradant systems, comprising:
A. said polymer system is selected from the group consisting of
  (a) about 100 parts by weight of highly saturated nitrile polymer having a degree of unsaturation ranging between about 1% to about 20%;
  (b) a blend of from about 80 to about 90 parts by weight of highly saturated nitrile polymer having a degree of unsaturation ranging between about 1% to about 20%, and of from about 10 to about 20 parts by weight of carboxylated nitrile; and
  (c) a blend of from about 45 to about 90 parts of highly saturated nitrile polymer having a degree of unsaturation ranging between about 1% to about 20%, of from about 1 to a maximum of about 5 parts of carboxylated nitrile polymer, 0.25 to about 2.0 parts by weight of an antioxidant selected from the group consisting of antioxidants from the respective families of
(a) quinolines,
(b) substituted para-phenylenediamine (PPD), and
(c) hindered bisphenols.

6. The composition of claim 3, wherein said filler system is modified to include a blend of said carbon black particles together with from about 1 to about 15 parts of fumed silica contributing to said overal 15-25 parts by weight of said highly reinforcing filler.

7. The composition of claim 4, wherein said antidegradant system consists of from about 0.25 to about 2 parts by weight of polymerized 1,2 dihydro-2,2,4 trimethyl-quinoline antioxidant (TMQ).

8. The composition of claim 4, wherein said antidegrandant system consists of from about 0.25 parts to about 2 parts by weight of a substituted paraphenylenediamine (PPD).

9. The composition of claim 4, wherein said antidgradant system comprises a substituted para-phenylenediamine (PPD) which is N-isopropyl phenyl-p-phenylenediamine.

10. The composition of any of claims 1, 2, 3, 4, and 5 in which said highly saturated nitrile polymer has a degree of unsaturation ranging between about 2.5% and about 5%; and wherein said curative compound consists of a tetra-methyl-thiuram disulfide.

11. The composition of any of claims 1, 2, 3, 4, and 5 in which said highly saturated nitrile polymer has a degree of unsaturation ranging between about 1% to about 20%, and in which said curative compound consists of dicumyl peroxide.

12. An improved vulcanizable elastomeric composition that has a unique combination of polymer, filler, curing, and antidegradant systems, comprising:
   A. said polymer system consists of about 100 parts by weight of a highly saturated nitrile polymer where the degree of unsaturation ranges from about 1% to about 20%; and
   B. said curing system comprises:
      (a) from about 1.5 to about 30 parts by weight of a metallic oxide selected from the group consisting of zinc oxide and magnesium oxide;
      (b) from about 25 to about 50 parts by weight of a metallic methylmethacrylate resin selected from the group consisting of a zinc methyl-methacrylate resin and a zinc dimethyl-methacrylate resin;
      (c) a curative compound of from about 0.25 parts to about 3 parts selected from the group consisting of:
         (i) dicumyl peroxide,
         (ii) derivatives of dicumyl peroxide;
         (iii) sulfur, and
         (iv) sulfur donor chemicals.

13. A process for preparation of a vulcanizable elastomeric composition, said process comprising the steps of:
   I. blending a mixture of
      A. about 100 parts by weight of highly saturated nitrile polymer where the degree of unsaturation ranges from about 1% to about 20%;
      B. from about 15 to about 25 parts by weight of a highly reinforcing filler,
      C. a curative mixture comprising
         (a) from about 1.5 to about 30 parts by weight of a metallic oxide selected from the group consisting of zinc oxide and magnesium oxide
         (b) from about 20 to about 50 parts by weight of a metallic methymethacrylate resin selected from the group consisting of a zinc methyl-methmethacrylate resin and a zinc dimethyl-methacrylate resin;
         (c) a curative compound of from about 0.25 parts to about 3 parts selected from the group consisting of:
            (i) dicumyl peroxide,
            (ii) derivatives of dicumyl peroxide;
            (iii) sulfur, and
            (iv) sulfur donor chemicals; and
      D. an antidegradant mixture comprising from about 0.25 to about 2 parts by weight of an antioxidant selected from the group consisting of the antioxidants from the respective families of
         (a) quinolines,
         (b) substituted para-phenylenediamine (PPD), and
         (c) hindered bisphenols; and
   II. recovering said mixture formed in step I.

14. The process of claim 13, wherein the mixing of the polymer alternatively includes blending of from about 80 parts to about 90 parts of the highly saturated nitrile, with from about 10 to about 20 parts of a carboxylated nitrile.

15. The process of claim 13, wherein the mixing of the polymer alternatively includes blending of from about 45 parts to about 90 parts of the highly saturated nitrile, with from about 1 to a maximum of about 5 parts of a carboxylated nitrile, and further with from about 5 to about 50 parts of a nitrile rubber.

16. The process of claim 13, wherein the blending of the filler material includes selecting the stated amounts of filler from the group consisting of:
   (a) medium processed channel black; and
   (b) highly reinforcing small particle carbon black selected from the group consisting of (1), (2), (3) and (4) as designated in the Table herein below:

TABLE

| | Carbon Blacks | | | | | | | Vulcanizates Containing Carbon Black | |
|---|---|---|---|---|---|---|---|---|---|
| | Target Values | | DBP No. | | | | Pour | $\Delta Stress^B$ at 300% Elongation MPa (psi) caused at 145° C. (293° F.) D412 D3182, and D3192 | |
| Designation | Iodine Adsorption No., $^A$D 1510, g/kg | DBP No. D 2414, cm$^3$/100 g | Compressed Sample, D 3493, cm$^3$/100 g | CTAB, D 3765, m$^2$/g | Nitrogen Adsorption, D 3037, m$^2$/g | Tint Strength, D 3265 | Density, D 1513, kg/m$^3$ (lb/ft$^3$) | 15 min | 30 min |
| 1. | 145 | 113 | 98 | 126 | 143 | 124 | 335(21.0) | −0.5(−70) | 0(0) |
| 2. | 121 | 132 | 112 | 121 | 132 | 121 | 320(20.0) | +2.0(+290) | +3.3(+480) |
| 3. | 121 | 114 | 100 | 111 | 119 | 115 | 345(21.5) | +0.3(+50) | +0.9(+130) |
| 4. | 82 | 102 | 88 | 83 | 83 | 103 | 375(23.5) | +1.4(+200) | +1.7(+250) |

NOTE 1-The iodine adsorption number and DBP number values represent target values. A target value is defined as an agreed upon value on which producers center their production process and users center their specifications. All other properties shown are averages of typical values supplied by several manufactures.
NOTE 2-IRB data was obtained from seats performed during the certification of IRB No. 6 carbon black.
$^A$In general, Method D 1510 can be used to estimate the surface area of furnace blacks but not channel, oxidated, and thermal blacks
$^B\Delta$Stress = stress at 300% elongation of test black - stress at 300% elongation of IRB No. 6
$^C$Stress at 300% elongation MPa(psi)cured at 145° C.(293° F.) for 50 min (Difference from IRB No. 6.)
S212: −3.4(−490)
S315: −3.4 (−490).

17. The process of claim 16, wherein the filler material is modified or further blended to include a blend of said carbon black particles together with from about 1 to about 15 parts of fumed silica contributing to said overall 15-25 parts by weight of said highly reinforcing material.

18. The process of claim 13, wherein the selecting of the antidegradant mixture consists of selecting an antioxidant from the quinoline family, which is polymerized 1,2 dihydro-2,2,4 trimethylquinoline (TMQ) antioxidant.

19. The process of claim 13, wherein the selecting of said antidegradant mixture comprises selecting an antioxidant from the para-phenylenediamine (PPD) family.

20. The process of claim 13, wherein the antidegradant mixture is selected from the an antioxidant family known as N-Isopropyl phenyl-p-phenylene-diamine.

21. The process of claim 13, wherein the mixing with the polymer includes using a polymer having a degree of unsaturation ranging between about 2.5% and about 5%; and further using a curative compound which consists of a sulfur donor N-cyclo-hexyl-2-benzothiazole sulfenamide.

22. The process of claim 13, wherein the mixing with the polymer includes using a polymer having a degree of unsaturation ranging between about 2.5% and about 5%; and further using a curative compound which consists of tetra-methyl-thiuram disulfide.

23. The process of any of claims 12–22 in which the polymer material includes highly saturated nitrile; and in which the selected curative compound is dicumyl peroxide.

24. The composition of claim 1 wherein said polymer system is selected from the group consisting of:
   (a) about 100 parts by weight of highly saturated nitrile polymer having a degree of unsaturation ranging between about 1% to about 5%;
   (b) a blend of from about 80 to about 90 parts by weight of highly saturated nitrile polymer having a degree of unsaturation ranging between about 1% to about 5%, and of from about 10 to about 20 parts by weight of carboxylated nitrile; and
   (c) a blend of from about 45 to about 90 parts of highly saturated nitrile polymer having a degree of unsaturation ranging between about 1% to about 5%, and of from about 1 to a maximum of about 5 parts of carboxylated nitrile polymer, and of from about 5 to about 50 parts of nitrile rubber.

25. The process of claim 13 wherein said polymer system is selected from the group consisting of:
   (a) about 100 parts by weight of highly saturated nitrile polymer having a degree of unsaturation ranging between about 1% to about 5%;
   (b) a blend of from about 80 to about 90 parts by weight of highly saturated nitrile polymer having a degree of unsaturation ranging between about 1% to about 5%, and of from about 10 to about 20 parts by weight of carboxylated nitrile; and
   (c) a blend of from about 45 to about 90 parts of highly saturated nitrile polymer having a degree of unsaturation ranging between about 1% to about 5%, of from about 1 to a maximum of about 5 parts of carboxylated nitrile polymer, and of from about 5 to about 50 parts of nitrile rubber.

* * * * *